United States Patent [19]

Nebelung et al.

[11] Patent Number: 4,637,827
[45] Date of Patent: Jan. 20, 1987

[54] PARISON TRANSFERRING MEANS

[75] Inventors: Hermann H. Nebelung, Zurich; Robert Huber, Wettingen; Fritz Futterknecht, Zurich, all of Switzerland

[73] Assignee: Emhart Industries, Inc., Farmington, Conn.

[21] Appl. No.: 805,153

[22] Filed: Dec. 4, 1985

[30] Foreign Application Priority Data

Dec. 4, 1984 [GB] United Kingdom ............... 8430531

[51] Int. Cl.$^4$ .............................................. C03B 9/40
[52] U.S. Cl. ........................................ 65/235; 65/239; 65/241; 65/260
[58] Field of Search ................. 65/239, 241, 260, 235

[56] References Cited

U.S. PATENT DOCUMENTS

| | | | |
|---|---|---|---|
| 3,233,999 | 2/1966 | Mumford | 65/235 X |
| 3,545,777 | 1/1976 | Rowe | 65/239 |
| 3,559,425 | 2/1971 | Irwin et al. | 65/241 X |
| 3,573,027 | 3/1971 | Nuzum, Sr. | 65/241 X |
| 3,617,233 | 11/1971 | Mumford | 65/235 X |
| 4,137,061 | 1/1979 | Mallory et al. | 65/241 X |
| 4,533,377 | 8/1985 | Libert | 65/235 X |

Primary Examiner—Arthur Kellogg
Attorney, Agent, or Firm—H. Samuel Kieser

[57] ABSTRACT

Parison transferring means for transferring glass parisons from a mould of a glassware manufacturing machine. A shaft (20) which carries supports (38) for neck rings which can grip or release a parison is turnable back and forth about a horizontal axis (22) to move the neck rings between gripping and releasing positions. The end positions of the arcuate movement about the axis (22) are determined by adjustable stops (70 and 100) which engage projections (42 and 102) of the shaft (20) or of the supports (38).

8 Claims, 4 Drawing Figures

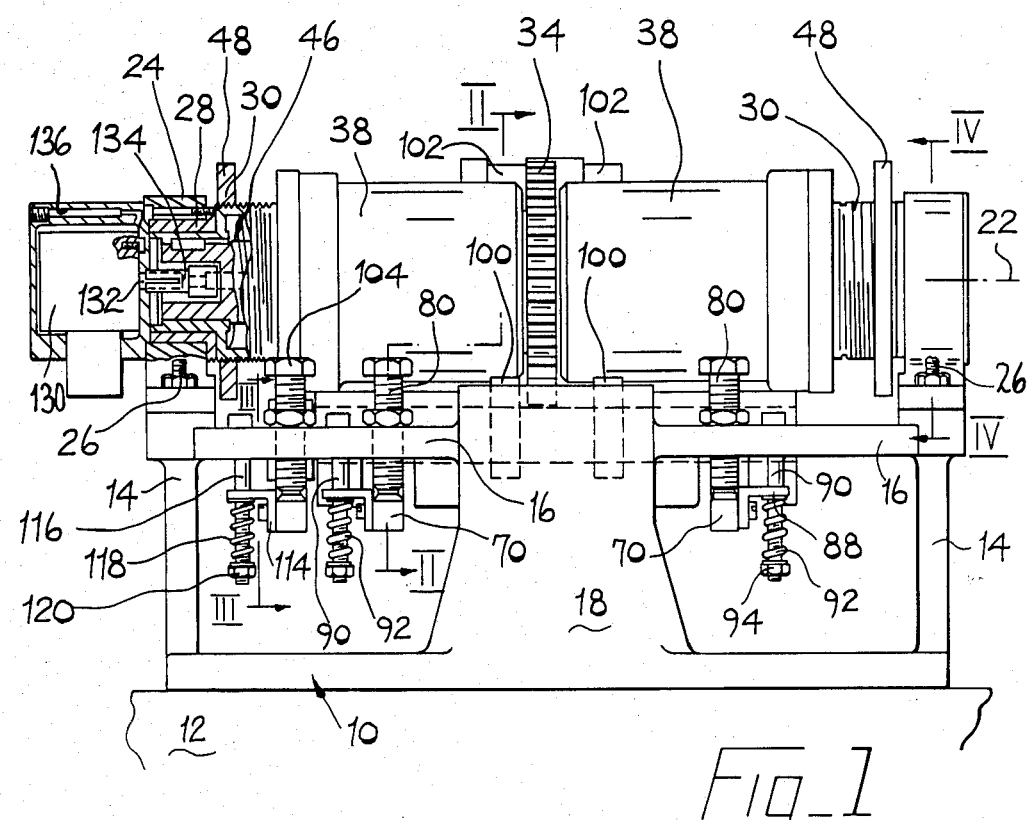
Fig_1
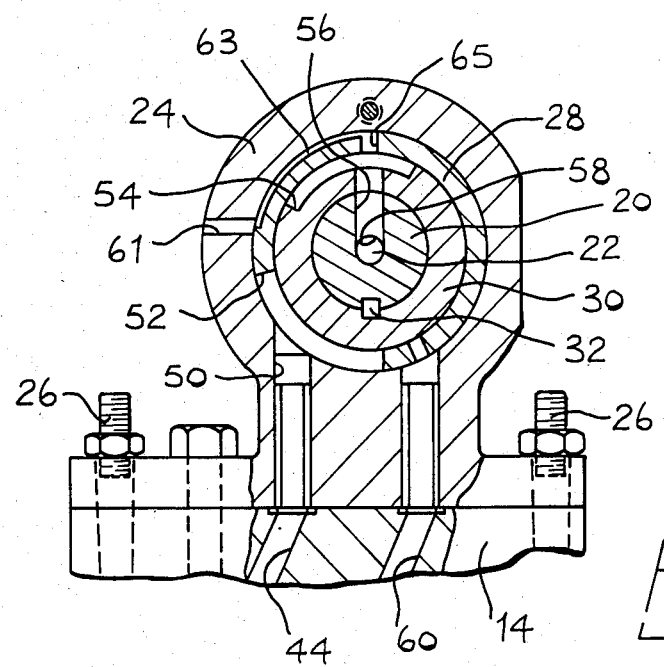
Fig_4

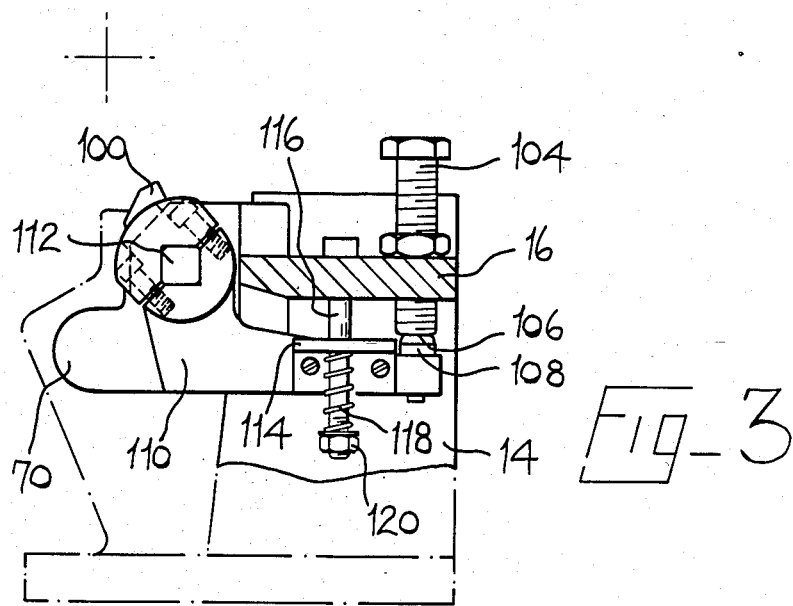
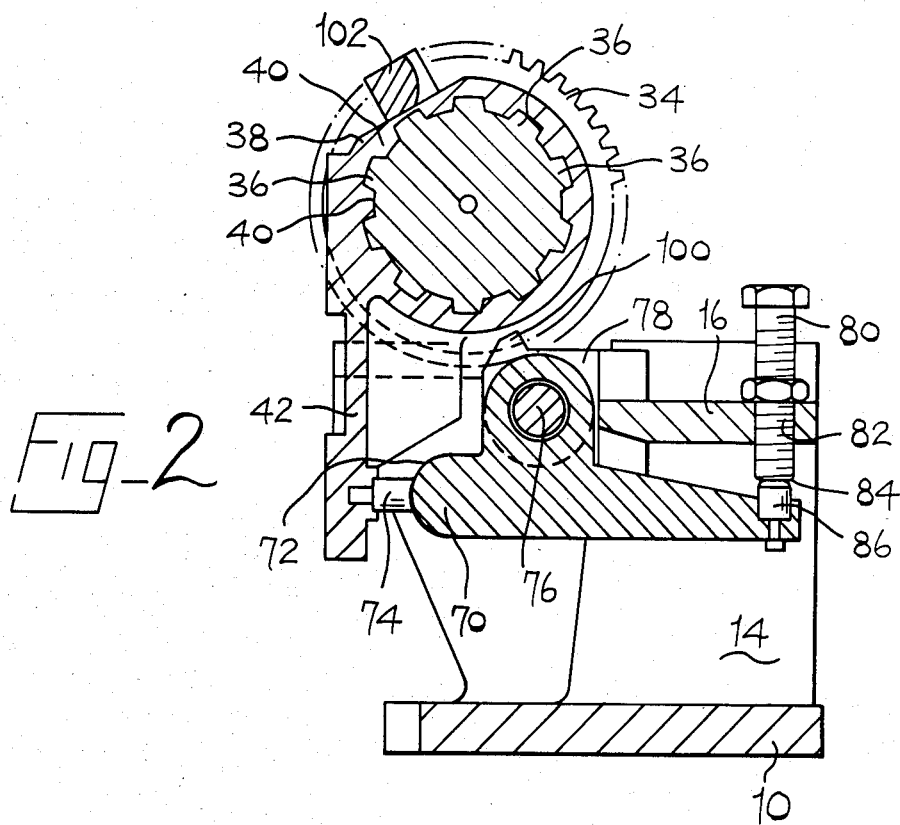

PARISON TRANSFERRING MEANS

BACKGROUND OF THE INVENTION

This invention is concerned with parison transferring means for use in transferring glass parisons from a parison forming mould of a glassware manufacturing machine to a further mould of the machine in which the parison is formed into an article of glassware or to further transferring means operable to transfer the parison to the further mould.

Glassware manufacturing machines of the standard "individual section" type are equipped with parison transferring means which operates after a parison has been formed in a parison forming mould, from a gob of molten glass by either a pressing or a blowing operation. The parison transferring means operates to transfer the parison to a further mould in which the parison is formed into an article of glassware by a blowing operation. Some machines of the individual section type have an intermediate station at which the parison is re-heated and/or partially formed before transfer to the further mould. In this type of machine, the parison transferring means transfers the parison to further transferring means operable to transfer the parison to the further mould after re-heating and/or partial forming.

The parison transferring means of a conventional machine comprises a shaft mounted on a supporting frame of the machine for turning movement about a horizontal longitudinal axis of the shaft arranged between the parison forming mould and the further mould. Two neck ring supports are mounted on the shaft to turn therewith and for sliding movement along the shaft towards or away from one another. The transferring means also comprises moving means, in the form of pneumatically-operated piston and cylinder assemblies with spring-return, operable to move the neck ring supports towards or away from one another as aforesaid. Thus, one or more split neck rings, half of each ring being supported by each support, can be moved between gripping and releasing conditions in which they can grip or release parisons.

The parison transferring means of a conventional machine also comprises turning means operable to turn the shaft back and forth along an arc about the horizontal axis. The turning movement is through approximately 180° between a position at which a neck ring supported by the supports is beneath a parison forming mould of the machine and a position at which the neck ring can release a parison into the further mould or into the further transferring mould. While the neck ring is beneath the parison forming mould, the neck ring cooperates with the mould in forming the parison which is gripped by the neck ring, portions of the mould then separate to allow the neck ring to pass between them as the turning means operates. After the parison has been released, the turning means operates to move the neck ring in the opposite direction along the arc to return the neck ring to beneath the parison forming mould to grip the next parison formed in the mould.

The turning means of the parison transferring means of a conventional machine comprises a vertically-disposed piston and cylinder assembly operable to move a vertically-extending piston rod. A toothed rack is mounted on the piston rod and meshes with a gear formed on the shaft. The arrangement is such that vertical movement of the piston of the assembly moves the toothed rack vertically turning the gear and thereby moving the neck ring. The end positions of the movement of the neck ring have to be precisely adjusted so that the neck ring cooperates correctly with the parison forming mould and with the further mould. This adjustment is made by moving adjustable stops which are mounted on end caps of the cylinder of the assembly to project into the cylinder and engage the piston so that the adjustment of the stops controls the rest positions of the piston and hence of the neck ring. However, as the cylinder is mounted within a supporting frame these stops are inaccessible and, furthermore, the precision of the adjustment may be affected by backlash between the rack and the gear which occurs between the stops and the neck ring.

It is an object of the present invention to provide parison transferring means in which the end positions of the movement along the arc are determined by adjustable stops which are accessible and the precision of the adjustment is not affected by backlash.

BRIEF SUMMARY OF THE INVENTION

The invention provides parison transferring means for use in transferring glass parisons from a parison forming mould of a glassware manufacturing machine to a further mould of the machine in which the parison is formed into an article of glassware, or to further transferring means operable to transfer the parison to the further mould, the transferring means comprising, a shaft mounted on a supporting frame for turning movement about a horizontal longitudinal axis of the shaft, two neck ring supports mounted on the shaft to turn therewith and for sliding movement along the shaft towards or away from one another, moving means operable to move the neck ring supports towards or away from one another as aforesaid so that one or more split neck rings, half of each ring being supported by each support, can grip or release parisons, and turning means operable to turn the shaft back and forth along an arc about the horizontal axis between a position at which a neck ring supported by the supports can grip a parison in the parison forming mould and a position at which the neck ring can release a parison into the further mould or into further transferring means operable to transfer the parison to the further mould, wherein the transferring means comprises adjustable stops mounted on the supporting frame and operable to determine the end positions of the movement along the arc by engagement with projections of the shaft or of the supports.

In parison transferring means according to the last preceding paragraph the adjustable stops are accessible and act directly on the shaft or supports. Furthermore, the turning means of the transferring means does not require adjustable stops and hence can be of simpler construction.

In order to balance the forces involved, it is advantageous if the stops comprise two stops for each end position arranged to engage the projections on opposite sides of a vertical centre-line of the shaft. Two stops may determine one end position by engagement with projections of the supports, each of these stops engaging a projection of a respective one of the supports. In this case, the adjustable stops may engage projections of the supports on which the neck ring halves are mounted so that the provision of further projections is avoided.

Two adjustable stops may conveniently determine one end position by engagement with projections from side surfaces of a gear portion of the shaft on which the turning means acts to turn the shaft. In this case, the other end position may be determined by two adjustable stops which engage projections of the supports as described above.

Each stop may conveniently be mounted on a horizontally-extending stop-supporting shaft to be pivoted about a horizontal axis by turning an adjustment screw associated with the stop. In this case, the stop-supporting shaft may be, mounted to turn about its horizontal axis and the or each stop which determines one end position may be fixed to the stop-supporting shaft to turn therewith, the stop-supporting shaft being turnable by turning an adjustment screw. This arrangement enables two stops to be adjusted by means of a single adjustment screw.

BRIEF DESCRIPTION OF THE DRAWINGS

There now follows a detailed description, to be read with reference to the accompanying drawings, of a parison transferring means which is illustrative of the invention. It is to be understood that the illustrative parison transferring means has been selected for description by way of example and not of limitation of the invention.

In the drawings

FIG. 1 is a front elevational view of the illustrative parison transferring means with parts broken away to show the construction;

FIG. 2 is a cross-sectional view taken on the line II—II in FIG. 1;

FIG. 3 is a cross-sectional view taken on the line III—III in FIG. 1; and

FIG. 4 is a cross-sectional view taken on the line IV—IV in FIG. 1.

DETAILED DESCRIPTION OF PREFERRED EMBODIMENT OF THE INVENTION

The illustrative parison transferring means is for use in transferring glass parisons from a parison forming mould of a glassware manufacturing machine of the conventional individual section type to a further mould of the machine in which the parison is formed into an article of glassware. The illustrative apparatus could alternatively be used in a machine of the individual section type having a re-heating station to transfer the parison to further transferring means operable to transfer the parison to the further mould. FIG. 1 shows the illustrative parison transferring means from a viewpoint between the further mould and the transferring means, the parison forming mould being behind the transferring means.

The illustrative parison transferring means is supported by a bracket 10 which is fastened to a horizontally-extending portion 12 of a frame of the machine. The bracket 10 has two pillar portions 14 which extend upwardly from the portion 12 and support a strut 16 which extends horizontally between the pillar portions 14. At a central portion thereof, the strut 16 supports the upper portion of a cullet chute 18 into which parisons being transferred can be dropped if required instead of being transferred to the further mould of the machine.

The illustrative parison transferring means also comprises a shaft 20 mounted on a supporting frame formed by the bracket 10 for turning movement about a horizontal longitudinal axis 22 of the shaft 20. Each of the pillar portions 14 of the bracket 10 supports a bearing retainer 24 which is secured by bolts 26 to the portion 14. Each bearing retainer 24 supports a bearing 28 in which an end cap 30 keyed to the shaft by a key 32 is turnably mounted. The shaft 20 is thus mounted to turn about the axis 22 by the end caps 30 turning on the bearings 28.

The shaft 20 has a gear portion 34 formed thereon mid-way between the end caps 30 and, hence, centred on a vertical centre-line of the shaft 20. The gear portion 34 has teeth which are meshed with the teeth of a toothed rack (not shown) which extends vertically and is mounted on the piston rod of a vertically-extending piston and cylinder assembly (not shown). The piston and cylinder assembly, piston rod, rack and gear portion 34 provide turning means of the illustrative parison transferring means operable to turn the shaft 20 back and forth along an arc about the horizontal axis 22. The shaft 20 is turned through approximately 180° by operation of the piston and cylinder assembly to move the rack so that the gear portion 34 is turned and the shaft 20 turns.

On each side of the gear portion 34, the shaft 20 is formed with longitudinal splines 36 (see FIG. 2). Two neck ring supports 38 of the illustrative parison transferring means are slidable on the splines 36 one on each side of the gear portion 34. Each support 38 surrounds the shaft 20 and is internally formed with splines 40 which fit between the splines 36 (see FIG. 2). The supports 38 are mounted to turn with the shaft 20, as engagement between the splines 36 and 40 transmits turning movement, and for sliding movement along the shaft 20 towards or away from one another, with the splines 36 and 40 moving past one another. Each support 38 has a projection 42 (see FIG. 2) on which an arm (not shown) can be mounted. Each projection receives the arm over a T-shaped projection in conventional manner and a clamping screw (not shown) secures the arm to the projection 42. The arm carries one or more (depending on the number of parisons to be transferred at a time) split half neck rings so that half of each neck ring is supported by each support 38. The supports 38 are movable together so that each half neck ring engages another so that a parison can be gripped between the half neck rings or apart so that a parison can be released.

The illustrative parison transferring means also comprises moving means operable to move the neck ring supports 38 towards or away from one another as aforesaid so that the one or more split neck rings supported by the supports 38 can grip or release parisons. The moving means is of conventional construction and comprises a piston and cylinder assembly formed by the shaft 20 and the support 38, in well-known manner, so that, when fluid under pressure is supplied to a passage 44 (see FIG. 4) in one of the portions 14, the supports 38 move apart, against the action of springs 46 retained by the end caps 30, to limits set by nuts 48 which are threadedly-received on externally-threaded enlarged portions of the end caps 30. On release of the fluid pressure, the supports 38 move together by the action of the springs 46. The passage 44 communicates with a passage 50 in the bearing retainer 24 which communicates with a groove 52 in the bearing 28. At certain positions of the shaft 20, the groove 52 communicates with a groove 54 in the end cap 30 which communicates via a radial passage 56 with a passage 58 which extends axially within the shaft 20 and communicates with both the piston and cylinder assemblies of the moving means.

A further passage 60 through each portion 14 and bearing retainer 24 provides lubrication to the bearings 28. A passage 61 through the bearing retainer 24 communicates with the groove 54 through a groove 63 and passage 65 in the bearing 28 to provide exhaust.

The turning means of the illustrative parison transferring means is, as aforementioned, operable to turn the shaft back and forth along an arc about the horizontal axis 22. This moves the supports 38 between a position at which a neck ring supported by the supports 38 can grip a parison in the parison forming mould and a position at which the neck ring can release a parison into the further mould of the machine. A parison is formed with the neck ring halves in engagement beneath the parison forming mould with the neck ring halves cooperating in forming the parison so that the neck ring halves grip the parison. The mould portions of the parison mould are then separated, the shaft 20 is turned through its arc carrying the parison between the portions of the parison forming mould, inverting it and bringing it to a position between separated portions of the further mould of the machine. The portions of the further mould then close around the mould and the supports 38 are moved apart so that the parison is released. The shaft 20 is then turned in the opposite direction and the supports 38 moved together so that the neck ring halves can collect another parison from the parison forming mould.

The illustrative parison transferring means also comprises adjustable stops mounted on the supporting frame and operable to determine the end positions of the movement along the arc by engagment with projections of the shaft 20 or of the supports 38. The end position at the parison forming mould end of the arc is determined by two stops 70 which are arranged to engage one of the projections 42 of the supports 38, in particular engagement occurs between a rounded face 72 of the stop 70 and a stud 74 carried by the projection 42. The stops 70 are mounted, at substantially equal distances on opposite sides of the vertical centre-line of the shaft 20, on a horizontally-extending stop-supporting shaft 76 which is turnably-supported on bearings 78 supported by the strut 16. The stops 70 are freely pivotal on the shaft 76. Each stop 70 can be pivotted about the shaft 76, to move the surface 72 and hence the end position of the shaft 20, by turning an adjustment screw 80 associated therewith. Each adjustment screw 80 is threadedly-received in a passage 82 passing vertically through the strut 16 and has a lower end 84 which engages a stud 86 which is carried by the stop 70. A bracket 88 (see FIG. 1) extends sideways from each stop 70 and has a vertical passage therethrough through which passes a bolt 90 which depends from the strut 16. A spring 92 acts between a nut 94 on the bolt 90 and the bracket 88 to retain the stud 86 in engagement with the lower end 84 of the screw 80. It should be noted that both the adjustment screws 80 are turned by the same amount to adjust the end position.

The other end position at the further mould end of the arc is determined by two stops 100 which project radially from the shaft 76 on opposite sides of the vertical centre-line of the shaft 20. Each stop 100 is arranged to engage a projection 102 from the side surfaces of the gear portion 34 of the shaft 20. The stops 100 are integral with the shaft 76 and can be adjusted together by turning the shaft 76. The shaft 76 can be turned by turning an adjusting screw 104 (see FIG. 3) which is threadedly received in a vertical threaded passage in the strut 16. The screw 104 has a lower end 106 which engages a stud 108 carried by a lever 110. The lever 110 is clamped to a reduced portion 112 of the shaft 76 which has a square cross-section so that turning the screw 104 moves the lever 110 turning the shaft 76 and adjusting the stops 100. A bracket 114 extends sideways from the lever 110 and has a vertical passage therethrough through which passes a bolt 116 which depends from the strut 16. A spring 118 acts between a nut 120 on the bolt 116 and the bracket 114 to retain the stud 108 in engagement with the lower end 106 of the screw 104.

The illustrative parison transferring means also comprises an encoder 130 mounted on one of the bearing retainers 24. The encoder 130 is to monitor the movement about the axis 22 and has an input shaft 132 coupled to the shaft 20 by a coupling 134. A passage 136 is provided for cooling air for the encoder 130.

The illustrative parison transferring means has end positions which are determined by the adjustable stops 70 and 100 which are readily accessible and these stops act directly on the supports 38 or the shaft 20.

We claim:

1. Parison transferring means for use in transferring glass parisons from a parison forming mould of a glassware manufacturing machine to a further mould of the machine in which the parison is formed into an article of glassware, or to further transferring means operable to transfer the parison to the further mould, the transferring means comprising, a shaft mounted on a supporting frame for turning movement about a horizontal longitudinal axis of the shaft, two neck ring supports mounted on the shaft to turn therewith and for sliding movement along the shaft towards or away from one another, moving means operable to move the neck ring supports towards or away from one another as aforesaid so that one or more split neck rings, half of each ring being supported by each support, can grip or release parisons, and turning means operable to turn the shaft back and forth along an arc about the horizontal axis between a position at which a neck ring supported by the supports can grip a parison in the parison forming mould and a position at which the neck ring can release a parison into the further mould or into further transferring means operable to transfer the parison to the further mould, wherein the transferring means comprises adjustable stops mounted on the supporting frame and operable to determine the end positions of the movement along the arc by engagement with projections of the shaft or of the supports.

2. Parison transferring means according to claim 1, wherein the stops comprise two stops for each end position arranged to engage the projections on opposite sides of a vertical centre-line of the shaft.

3. Parison transferring means according to claim 1, wherein two adjustable stops determine one end position by engagement with projections of the supports, each of these stops engaging a projection of a respective one of the supports.

4. Parison transferring means according to claim 3, wherein the two adjustable stops engage projections of the supports on which the neck ring halves are mounted.

5. Parison transferring means according to claim 1, wherein two adjustable stops determine one end position by engagement with projections from side surfaces of a gear portion of the shaft on which the turning means acts to turn the shaft.

6. Parison transferring means according to claim 5, wherein two adjustable stops determine the other end position by engagement with projections of the supports, each of these stops engaging a projection of a respective one of the supports.

7. Parison transferring means according to claim 1, wherein each stop is mounted on a horizontally-extending stop-supporting shaft to be pivotted about a horizontal axis by turning an adjustment screw associated with the stop.

8. Parison transferring means according to claim 7, wherein the stop-supporting shaft is mounted to turn about its horizontal axis and the or each stop which determines one end position is fixed to the stop-supporting shaft to turn therewith, the stop-supporting shaft being turnable by turning an adjustment screw.

* * * * *